(12) United States Patent
Feng (10) Patent No.: US 8,875,102 B1
(45) Date of Patent: Oct. 28, 2014

(54) MULTIPLE BROWSER ARCHITECTURE AND METHOD

(75) Inventor: He Feng, Beijing (CN)

(73) Assignee: Google Inc., Mountain View, CA (US)

( * ) Notice: Subject to any disclaimer, the term of this patent is extended or adjusted under 35 U.S.C. 154(b) by 1197 days.

(21) Appl. No.: 12/402,756

(22) Filed: Mar. 12, 2009

(51) Int. Cl.
*G06F 9/44* (2006.01)

(52) U.S. Cl.
USPC ............................ 717/124; 717/127; 717/135

(58) Field of Classification Search
CPC .......................... G06F 11/3414; G06F 11/3672
USPC ................................... 717/124, 114, 127, 135
See application file for complete search history.

(56) References Cited

U.S. PATENT DOCUMENTS

| | | | | |
|---|---|---|---|---|
| 7,950,018 | B2 * | 5/2011 | Peller et al. | 719/312 |
| 8,065,659 | B1 * | 11/2011 | Prince et al. | 717/115 |
| 2006/0064399 | A1 * | 3/2006 | De Sio | 707/1 |
| 2006/0101404 | A1 * | 5/2006 | Popp et al. | 717/124 |
| 2007/0234217 | A1 * | 10/2007 | Miller et al. | 715/738 |
| 2009/0249216 | A1 * | 10/2009 | Charka et al. | 715/744 |
| 2010/0088677 | A1 * | 4/2010 | Li et al. | 717/124 |
| 2010/0251217 | A1 * | 9/2010 | Miller | 717/126 |

OTHER PUBLICATIONS

Selenium (software), http://en.wikipedia.org/wiki/Selenium_(software), downloaded Jan. 16, 2009, pp. 2.
Selenium IDE, http://seleniumhq.org/about/how-it-works.png, downloaded Jan. 6, 2009, 1 page.
Tutorial, http://seleniumhq.org/documentation/tutorials/, downloaded Jan. 16, 2009, pp. 5.

* cited by examiner

*Primary Examiner* — Matt Kim
*Assistant Examiner* — Hua Lu
(74) *Attorney, Agent, or Firm* — Lerner, David, Littenberg, Krumholz & Mentlik, LLP (57) ABSTRACT

Aspects of the invention enable testing and operation of scripts or other applications on multiple browsers at the same time. The browsers may run on different operating systems and platforms. This permits the user to observe and manage any differences in script functionality in the different browsers. An application developer may create a script or other application, run the application in one browser and observe results simultaneously in one or more other browsers. Operation may occur in a step by step process in a specific domain to determine how the script/application works in the different browsers. Such operation may occur in a real time procedure, providing instantaneous feedback and speeding up the application development process.

15 Claims, 5 Drawing Sheets

MULTIPLE BROWSER ARCHITECTURE AND METHOD

BACKGROUND OF THE INVENTION

1. Field of the Invention

Aspects of the invention relate generally to web browser applications. More specifically, aspects of the invention pertain to working simultaneous with multiple browsers and operating systems such as in a web design/development process.

2. Description of Related Art

In the past, a number of web browsers have been developed such as Firefox, Chrome, Internet Explorer and Safari. Different web browsers may run on one or more operating systems, such as Linux, MacOS or the Windows operating systems.

In view of this, web developers often prepare applications to run on multiple web browsers, or even different versions of the same browser. This is often necessary because applications may run and/or present differently on various browsers. Results may also differ depending on which operating system is used. Thus, developers often replicate their work across a number of platforms to determine the effects. This can be a time consuming and cumbersome process which hinders application development.

BRIEF SUMMARY OF THE INVENTION

In accordance with aspects of the invention, tools are provided to operate in one browser while viewing results simultaneously in other browsers. This promotes efficient and cost effective application development.

In one embodiment, a system is provided for executing a computer application in a computer architecture. The system comprises a running environment module, a control browser module, a remote browser module and a processor. The running environment module manages at least one preselected script. The control browser module runs a computer application on a first computer architecture having a first browser. The control browser module is operable to generate a test script from the at least one preselected script and to execute the test script on the first browser. The remote browser module receives the test script and executes the test script on at least one second computer architecture having a second browser different from the first browser. The remote browser module is operable to execute the test script on the second browser simultaneously while the test script is executed on the first browser by the control browser module. The processor manages operation of the running environment module, control browser module and remote browser module.

In one example, the system further comprises a user interface module for displaying execution of the test script on the first and second browsers to a user. In another example, the control browser module generates a new test script for selected actions performed in the first browser, and the remote browser module executes each new test script upon generation by the control browser module so that the selected actions performed in the first browser are replicated in the second browser.

In one alternative, the running environment module manages the at least one preselected script by initializing a web application testing framework and setting a machine address and browser type for the second browser. Here, the machine address and browser type may be set in a machine configuration file. In this case, the machine configuration file further includes a port and test uniform resource locator. Optionally, the control browser module is operable to generate the test script based upon a template file for the web application testing framework and the machine configuration file.

In another alternative, the at least one preselected script comprises a template script that initializes a running environment and a remote machine configuration script that configures the second computer architecture and the second browser. Here, the at least one preselected script may further comprise a core script that is executed by the system to generate new test scripts for each action by a user in the first browser. In this case, the remote browser module executes the new test scripts with the second browser.

In accordance with another embodiment, a method of executing a computer application in a computer architecture is provided. The method comprises configuring a running environment for managing a preselected script; running a computer application on a first computer architecture having a processing device and a first browser, including generating a test script from the preselected script and executing the test script on the first browser using the first processing device; and executing the test script on at least one second computer architecture having a second browser different from the first browser, including executing the test script on the second browser simultaneously while the test script is executed on the first browser by the control browser module, wherein user actions in the first browser are replicated in real time in the second browser.

In one example, configuring the running environment includes initializing a web application testing framework and setting a machine address and browser type for the second browser. In another example, for each new action in the first browser, the method further comprises updating the test script to emulate the new actions in the second browser. In this case, updating the test script may include modifying a template file based upon a selected one of the actions in the first browser. And in another example, the user actions are replicated in real time in the second browser by the processing device.

A further embodiment provides a system for executing a computer application in a computer architecture. The system comprises running environment means for managing at least one preselected script; control browser means for running a computer application on a first computer architecture having a first browser, the control browser module being operable to generate a test script from the at least one preselected script and to execute the test script on the first browser; and remote browser means for receiving the test script and for executing the test script on at least one second computer architecture having a second browser different from the first browser, the remote browser module being operable to execute the test script on the second browser simultaneously while the test script is executed on the first browser by the control browser module.

In yet another embodiment, a computer-readable recording medium is provided that has instructions stored thereon. The instructions, when executed by a processor, cause the processor to perform the operations of configuring a running environment for managing a preselected script; running a computer application on a first computer architecture having the processor and a first browser, including generating a test script from the preselected script and executing the test script on the first browser using the first processing device; and executing the test script on at least one second computer architecture having a second browser different from the first browser, including executing the test script on the second browser simultaneously while the test script is executed on the first browser by the control browser module, wherein user actions in the first browser are replicated in real time in the second browser.

In one example, configuring the running environment includes initializing a web application testing framework and setting a machine address and browser type for the second browser. In another example, for each new action in the first browser, the method further comprises updating the test script to emulate the new actions in the second browser. In this case, updating the test script may include modifying a template file based upon a selected one of the actions in the first browser.

DETAILED DESCRIPTION

The aspects, features and advantages of the invention will be appreciated when considered with reference to the following description of preferred embodiments and accompanying figures. The following description does not limit the invention; rather, the scope of the invention is defined by the appended claims and equivalents.

In accordance with one embodiment of the invention, application developers may create scripts or other applications, incorporate those scripts into a single test script, and execute the test script in one browser and observe results simultaneously in one or more other browsers. Developers may operate step by step in a specific domain and see how the test script application works in different browsers.

Figure 1:
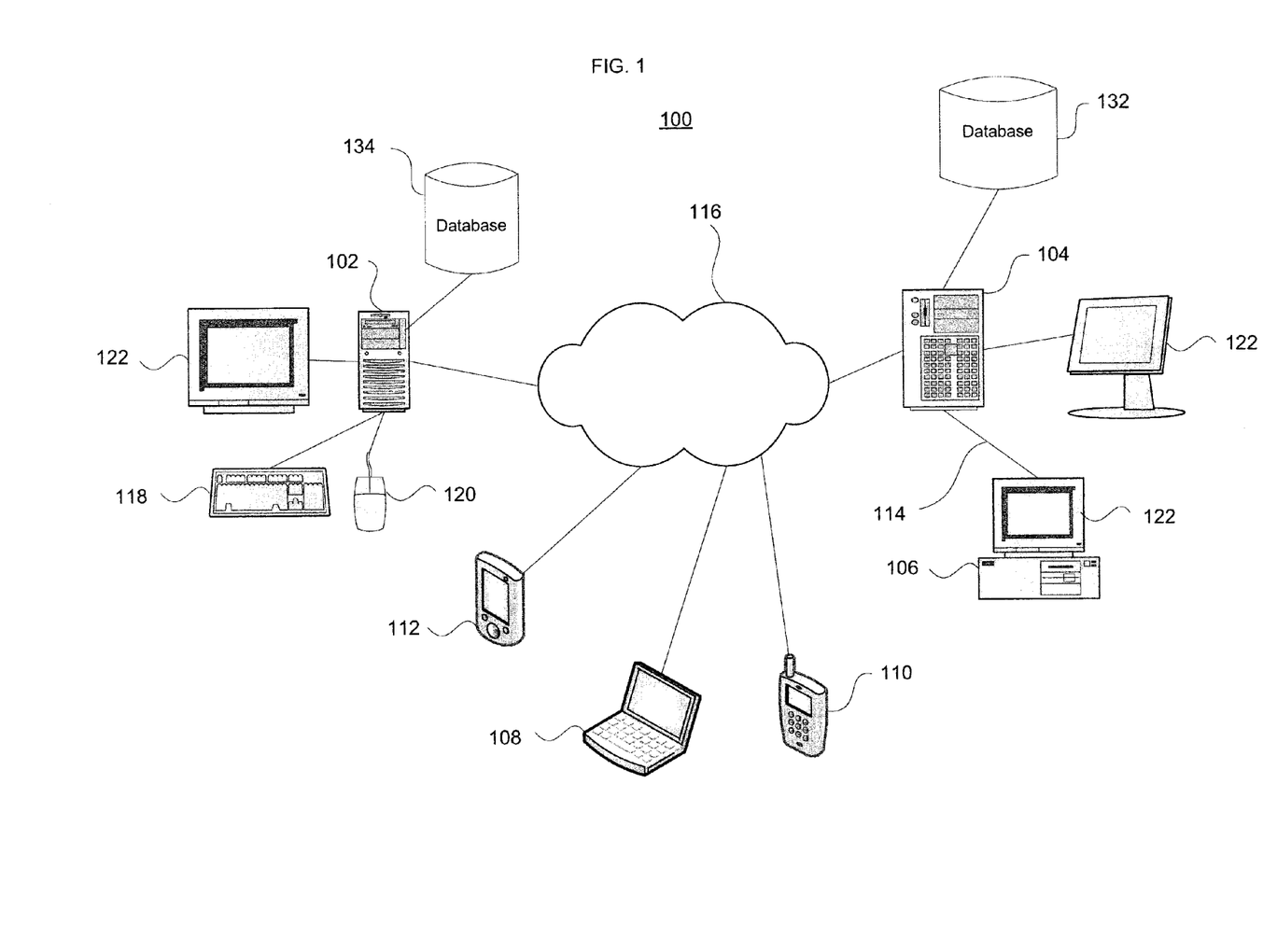
FIG. 1 illustrates a distributed computer architecture in accordance with one aspect of the invention.

FIG. 1 presents a schematic diagram of a computer system depicting various computing devices that can be used alone or in a networked configuration in accordance with aspects of the invention. For example, this figure illustrates a computer network 100 having a plurality of computers 102, 104, 106 and 108 as well as other types of devices such as portable electronic devices such as a mobile phone 110 and a PDA 112. Such devices may be interconnected via a local or direct connection 114 and/or may be coupled via a communications network 116 such as a LAN, WAN, the Internet, etc. and which may be wired or wireless. Web browser applications may be developed to run on any or all of these devices.

Each device may include, for example, one or more processing devices and have user inputs such as a keyboard 118 and mouse 120 and/or various other types of input devices such as pen-inputs, joysticks, buttons, touch screens, etc., as well as a display 122, which could include, for instance, a CRT, LCD, plasma screen monitor, TV, projector, etc. Each computer 102, 104, 106 and 108 may be a personal computer, server, etc. By way of example only, computers 102 and 106 may be personal computers while computer 104 may be a server and computer 108 may be a laptop. These devices may run the same or different operating systems.

Figure 2:
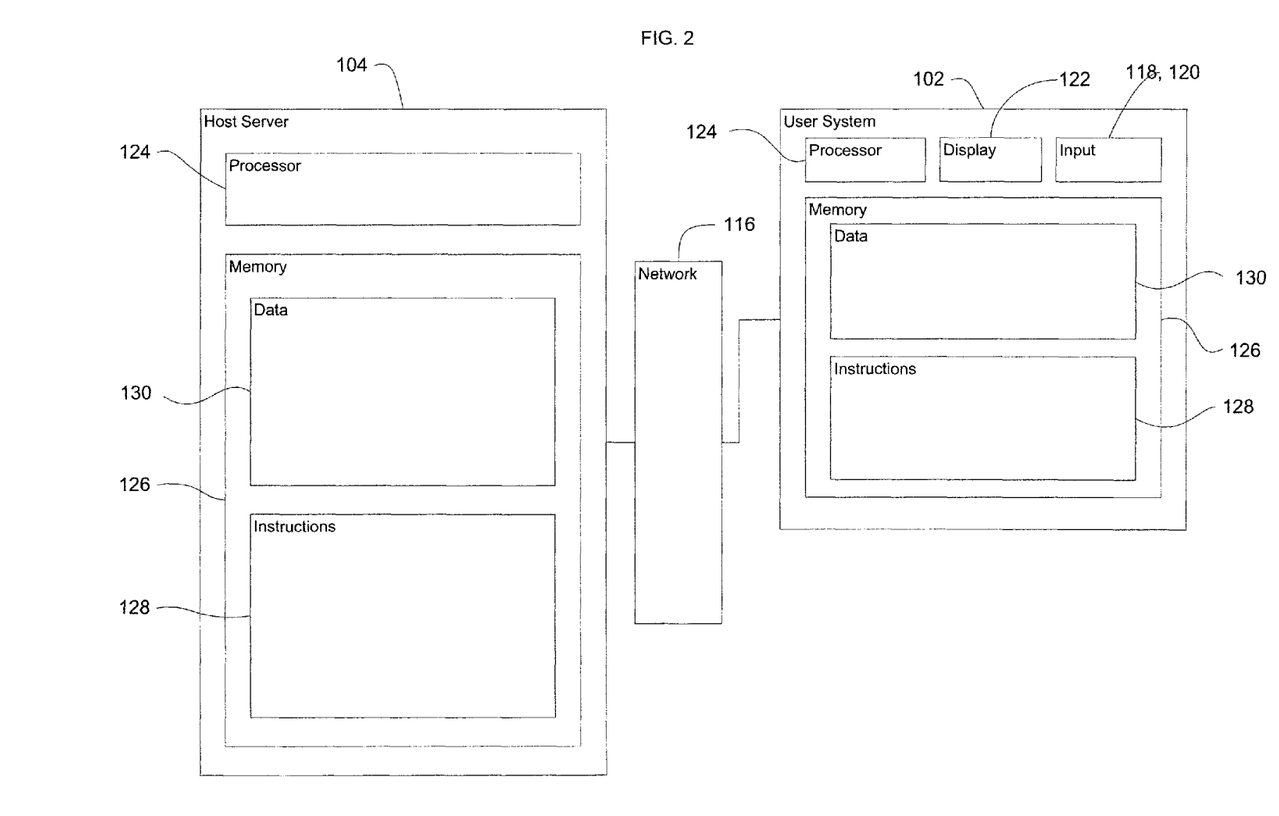
FIG. 2 illustrates aspects of the computer architecture of FIG. 1.

As shown in FIG. 2, each computer such as computers 102 and 104 contains a processor 124, memory/storage 126 and other components typically present in a computer. For instance, memory/storage 126 stores information accessible by processor 124, including applications, scripts and/or instructions 128 that may be executed by the processor 124 and data 130 that may be retrieved, manipulated or stored by the processor. The memory/storage may be of any type or any device capable of storing information accessible by the processor, such as a hard-drive, ROM, RAM, CD-ROM, flash memories, write-capable or read-only memories. The processor 124 may comprise any number of well known processors, such as processors from Intel Corporation. Alternatively, the processor may be a dedicated controller for executing operations, such as an ASIC.

The instructions 128 may comprise any set of instructions to be executed directly (such as machine code) or indirectly (such as scripts) by the processor(s). In that regard, the terms "instructions," "steps" and "programs" may be used interchangeably herein. The instructions may be stored in any computer language or format, such as in object code or modules of source code. The functions, methods and routines of instructions in accordance with the invention are explained in more detail below.

Data 130 may be retrieved, stored or modified by processor 124 in accordance with the instructions 128. The data may be stored as a collection of data. For instance, although the invention is not limited by any particular data structure, the data may be stored in computer registers, in a relational database as a table having a plurality of different fields and records, XML documents, etc.

The data may also be formatted in any computer readable format such as, but not limited to, binary values, ASCII or Unicode. Similarly, the data may include images stored in a variety of formats such as vector-based images or bitmap images using lossless (e.g., PNG) or lossy (e.g., JPEG) encoding. Moreover, the data may include any information sufficient to identify the relevant information, such as descriptive text, proprietary codes, pointers, references to data stored in other memories (including other network locations), metadata or information which is used by a function to calculate the relevant data.

Although the processor 124 and memory 126 are functionally illustrated in FIG. 2 as being within the same block, it will be understood that the processor and memory may actually comprise multiple processors and memories that may or may not be stored within the same physical housing or location. For example, some or all of the instructions and data may be stored on a removable CD-ROM and others within a read-only computer chip. Some or all of the instructions and data may be stored in a location physically remote from, yet still accessible by, the processor. Similarly, the processor may actually comprise a collection of processors which may or may not operate in parallel. Data may be distributed and stored across multiple memories 126 such as hard drives or the like.

In one aspect, server 104 may communicate with one or more client computers 102, 106 and/or 108, as well as devices such as mobile phone 110 and PDA 112. Each client computer or other client device may be configured similarly to the server 104, with a processor, memory and instructions, as well as one or more user input devices 118, 120 and a user output device, such as display 122. Each client computer may be a general purpose computer, intended for use by a person, having all the components normally found in a personal computer such as a central processing unit ("CPU"), display, CD-ROM or DVD drive, hard-drive, mouse, keyboard, touch-sensitive screen, speakers, microphone, modem and/or router (telephone, cable or otherwise) and all of the components used for connecting these elements to one another.

The server 104 and user computers and other devices are capable of direct and indirect communication with other computers, such as over network 116. Although only a few computing devices are depicted in FIGS. 1 and 2, it should be appreciated that a typical system can include a large number of connected servers and clients, with each different computer being at a different node of the network. The network 116, and intervening nodes, may comprise various configurations and protocols including the Internet, intranets, virtual private networks, wide area networks, local networks, private networks using communication protocols proprietary to one or more companies, Ethernet, WiFi, Bluetooth or TCP/IP. An example of an application used in such a network is a web browser.

Communication across the network, including any intervening nodes, may be facilitated by any device capable of transmitting data to and from other computers, such as modems (e.g., dial-up or cable), network interfaces and wireless interfaces. Server 104 may be a web server. Although certain advantages are obtained when information is transmitted or received as noted above, other aspects of the invention are not limited to any particular manner of transmission of information. For example, in some aspects, the information may be sent via a medium such as a disk, tape, CD-ROM, or directly between two computer systems via a dial-up modem. In other aspects, the information may be transmitted in a non-electronic format and manually entered into the system.

Moreover, computers and user devices in accordance with the systems and methods described herein may comprise any device capable of processing instructions and transmitting data to and from humans and other computers, including network computers lacking local storage capability, PDA's with modems such as PDA 112 and Internet-capable wireless phones such as mobile phone 110. Such devices are desirably capable of running web browsing applications.

As shown in FIG. 1, the network 100 may also include an application database 132, which may be directly or indirectly coupled to server 104. In an alternative, the application database 132 may be part of or otherwise logically associated with the server 104. A browser application 134 may be part of or logically associated with a user device such as computer 102. In an alternative, the browser application 134 may be directly or indirectly coupled to the computer 102.

Figure 3:
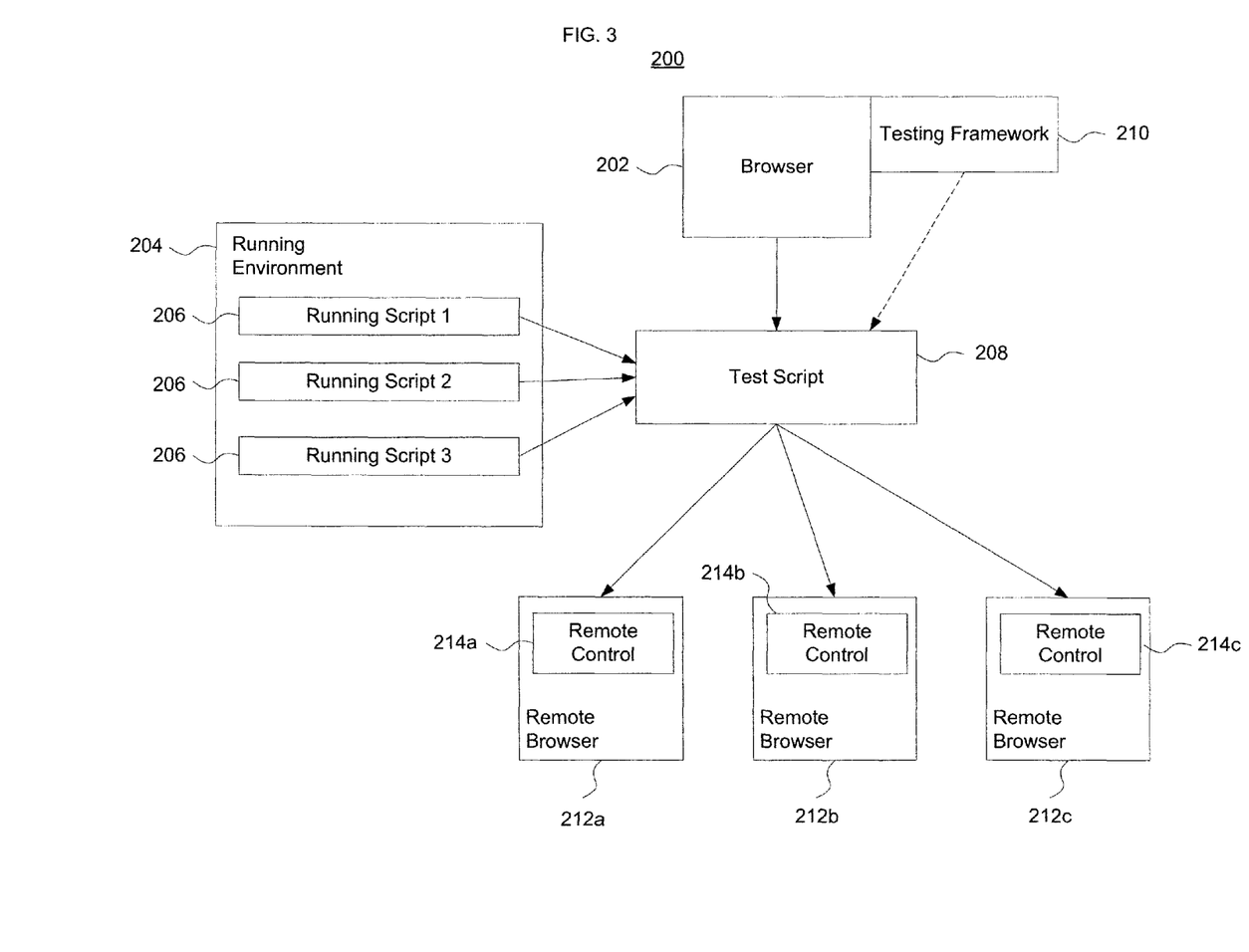
FIG. 3 illustrates an application environment in accordance with aspects of the invention.

FIG. 3 illustrates an application environment 200 in accordance with aspects of the invention. As shown, the environment 200 may include a browser 202 such as Chrome, Firefox (e.g., Firefox 1.5, 2.0 or 3.0), Internet Explorer (e.g., Internet Explorer 6.0, 7.0 or 8.0) and Safari (e.g., Safari 3.2 or 3.2.1) and a running environment 204. The running environment 204 may include one or more "running scripts" 206 for testing. According to one example, a first running script is a template script for initializing the running environment. In this example, a second running script is a remote machine configuration script that configures a particular machine and a browser to run on that machine. A third running script is a core script such as a batch file which operates on the template and configuration scripts.

The template script may be written, by way of example only, in the Python programming/scripting language. The running environment may be Selenium. An example of the machine configuration script may configure a specific machine to use a selected browser such as Internet Explorer 6. The configuration may specify the machine (e.g., via IP address), a port to use, the browser and a test Uniform Resource Locator ("URL"). Thus, in this example, the machine configuration script may recite: 192.168.0.3 (IP address) 4444 (port) IE (for Internet Explorer 6) and "http://www.google.com" (URL).

An example of a remote machine configuration script is reproduced below.

```
@echo off &setlocal EnableDelayedExpansion
rem remove all generated files
del /f /q . .\*.txt 2>nul
del /f /q . .\scripts\*.* 2>nul
rem copy selenium.py to . .\scripts\
copy selenium.py . .\scripts\
for /f "tokens=1-4" %%i in (machines.conf) do (
    set ip=%%i
    set port=%%j
    set browser=%%k
    set url=%%l
    rem sed  {s/IP/%%i/;s/PORT/%%j/;s/BROWSER/
         %%k/;s/URL/%%l/}
now.py >>!ip!.py
    for /f "tokens=1* delims=:" %%a in ('findstr /n .*
        now.py') do (
        if not %%a==7 (echo.%%b>>. ./scripts/!ip!.py) else (
            echo. self.selenium=selenium("!ip!",
"!port!", "!browser!", !url!^)>>. ./scripts/!ip!.py
        )
    )
    echo.python . .\scripts\!ip!.py >>. .\scripts\!ip!.bat ping
        127.1>>nul
    start . .\scripts\!ip!.bat
)
:end
```

Figure 4:
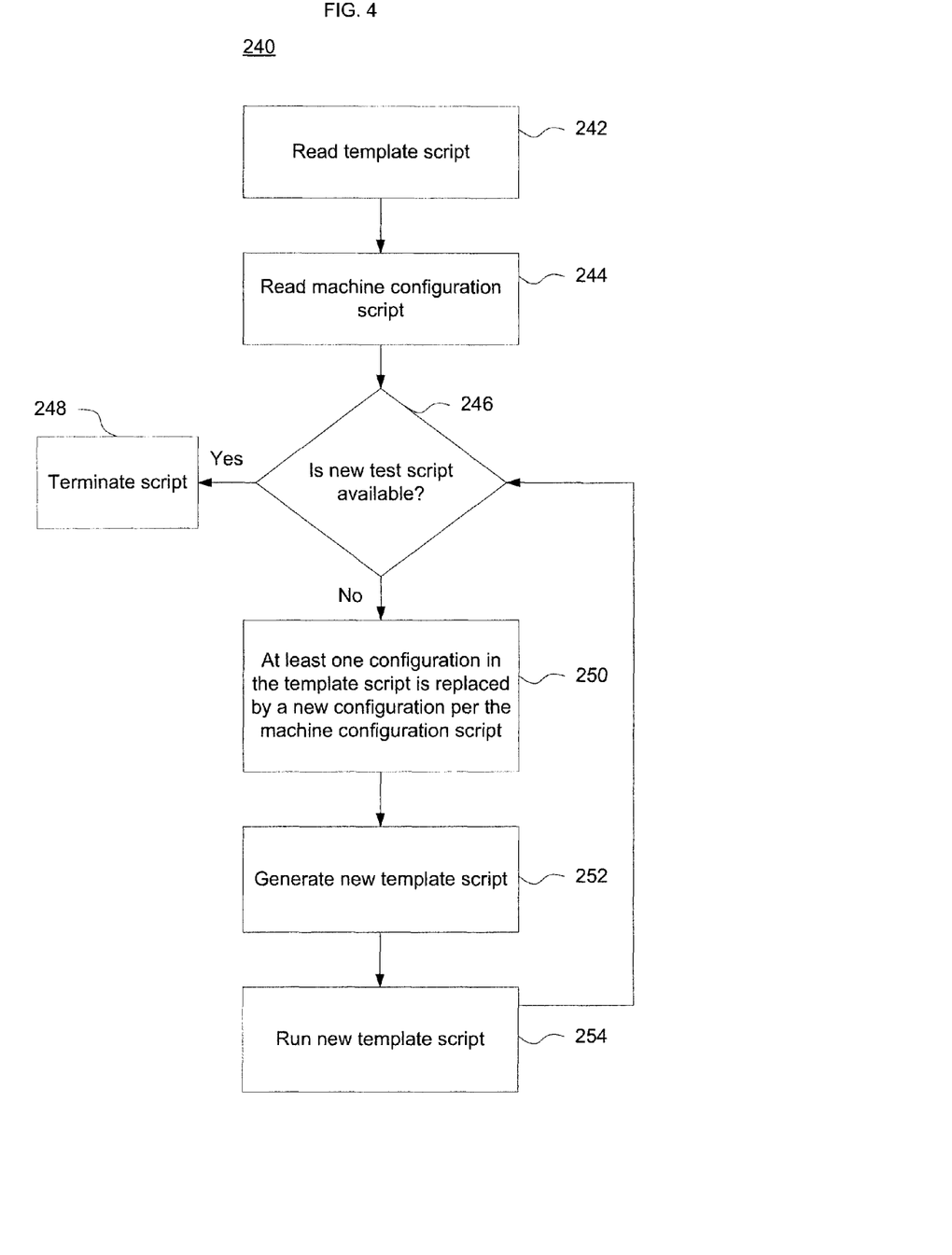
FIG. 4 is a flow diagram illustrating a core script in accordance with one aspect of the invention.

FIG. 4 illustrates an example of a core script 240. The template script is read by the core script in block 242 and the machine configuration script is read by the core script in block 244. As shown in block 246, a determination is made whether or not the end of the machine configuration script has been reached. If it has, the script terminates in block 248. If it has not, then as shown in block 250 at least one configuration in the template script is replaced by a new configuration per the machine configuration script and a new template script is generated in block 252. Then, as shown in block 254, the new template script is run. This process returns to block 246 until the end of the configuration file is reached.

Returning to FIG. 3, the application environment 200 desirably combines the running scripts 206 into a test script 208 or otherwise creates the test script 208 from the running scripts 206. This may be done using the browser 202 to create the test script 208. The test script 208 may include one or more sub-scripts. The test script 208 may be formed as an open-source script such as an open source application created using the Python programming language. This provides for transparency and rapid debugging.

The application environment 200 may also include a web application testing framework 210 such as Selenium. Selenium may be run in using the Selenium "farm" with an Integrated Development Environment ("IDE"). The Selenium IDE allows for recording, editing and debugging of browser tests. The test script(s) 208 may also be formed using the web application testing framework 210, as shown by the dotted arrow. The application testing framework may be part of the browser 202, an overlay on the browser 202 or otherwise used in conjunction with the browser 202.

The test script(s) 208 may be run on one or more remote browsers 212, such as browsers 212a, 212b and 212c. By way of example only, browser 212a may be a Firefox 3.0 browser, browser 212b may be an Internet Explorer 8.0 browser, and browser 212c may be a Safari 3.2.1 browser. These browsers 212 may run on the same or different operating systems, which in turn may run on the same or different computing platforms, such as computers 102, 104 and 106 of FIG. 1.

In accordance with one embodiment of the invention, when a user uses browser 202, testing framework 210 will generate test script 208 according to the user's actions in the browser. The scripts 206 start to run, looping to see whether there is a new test script 208 generated. When the user performs an action with the browser 202, testing framework will generate the test script 208.

In one example, a remote control program 214 manages execution of the test script 208 on each respective browser 212. Optionally, individual remote control programs 214a, 214b and 214c as shown in FIG. 3 manage execution for respective browsers 212a, 212b and 212c. This enables the user running the test script 208 to view results on the browsers 212 simultaneously, providing instantaneous feedback to the user. The remote browsers may be virtual browsers running simultaneously on the same machine as the browser 202. For instance, the same processor(s) may run the remote browser (s) 212 along with the browser 202 and display the results on one or more display devices, such as displays 122 of FIG. 1.

Figure 5:
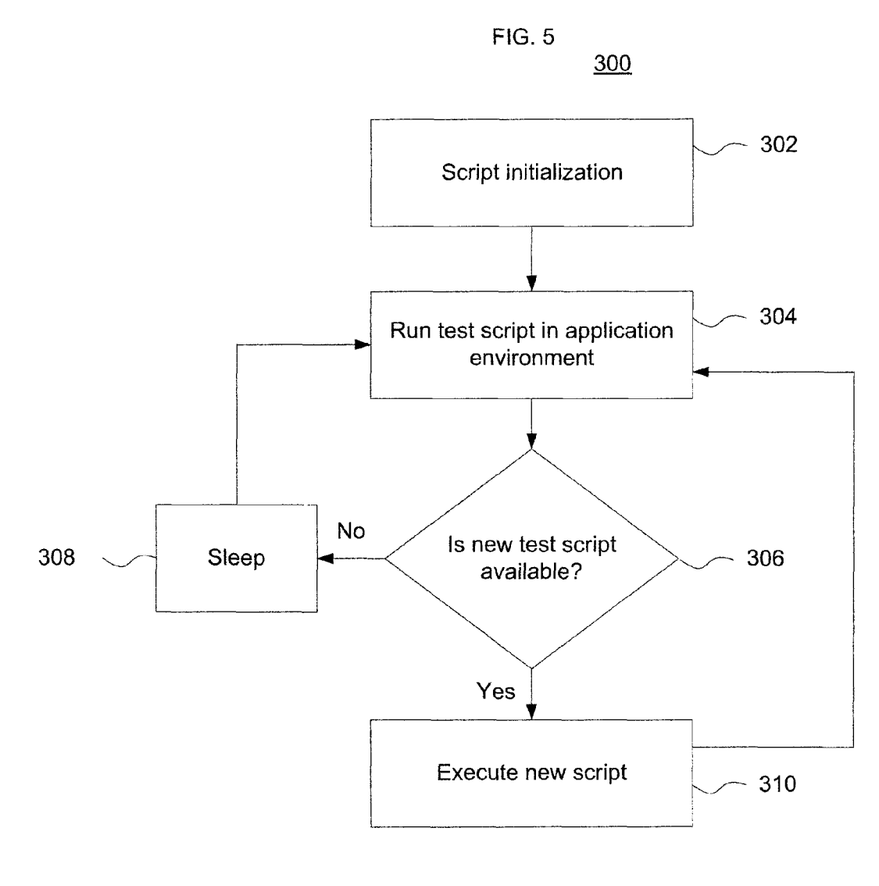
FIG. 5 is a flow diagram illustrating a script testing procedure in accordance with one aspect of the invention.

FIG. 5 illustrates a process 300 for executing test scripts in accordance with aspects of the invention. The process initializes as shown in block 302. As shown in block 304, a script such as test script 208 of FIG. 2 may be run in the application environment. The script may be run continuously. By way of example only, the test script 208 may be run in a first browser (e.g., browser 202) on a first computing platform while also being run in one or more other browsers (e.g., remote browsers 212a-c). The other browser(s) are different than the first browser. For instance, the first browser may be a Firefox 3.0 browser, while one remote browser is an Internet Explorer 8.0 browser and another remote browser is a Safari 3.2.1 browser. The different browsers may be implemented on the same or different operating systems.

These browsers are managed so that the script of interest (e.g., test script 208) is run concurrently on the browsers at the same time. Operations or actions taken in the first browser are linked for concurrent operation in the other browser(s). In one example, a Python script is generated to perform this process. This enables the user to observe, in real time, the functionality of the script of interest on the different platforms used. Any issues or discrepancies may be identified and flagged for correction. Once such changes have been made, such as by modifying one or more of the running scripts 206 in the running environment 204, the application may be retested as discussed above.

As indicated in block 306, a query may determine if a new test script is available. If not, as shown in block 308, the process may sleep for a predetermined period of time before returning to block 304. The sleep time may vary depending on the particular implementation. By way of example, the sleep time may vary between 0.5 and 1.0 seconds or more.

If there is a new test script, the process may continue at block 310. Here, as shown, the new test script may be executed. This may be done, as in the example above, by running one or more remote control programs to manage execution of the test script on different browsers. Upon execution, the process may continue as shown by the arrow from block 310 to block 304.

While certain steps and processes have been described and illustrated in a particular order, it should be understood that such actions may occur in a different order or concurrently.

The invention claimed is:

1. A method of executing a computer application in a computer architecture, the method comprising:

configuring a running environment for managing a preselected script;

running a computer application on a first computer architecture having a processing device, a first operating system, and a first browser, including generating a test script from the preselected script and executing the test script on the first browser using the first processing device;

transmitting the test script to at least one second computer architecture on a remote device having a second browser different from the first browser, a second operating system different from the first operating system, and a remote control program for executing the test script on the second browser simultaneously while the test script is executed on the first browser, wherein user actions in the first browser are replicated in real time in the second browser; and receiving results from the remote device upon execution of the transmitted test script;

wherein the preselected script comprises:

a core script that is executed by the system to generate new test scripts for each action by a user in the first browser, a template script that initializes a running environment, and a remote machine configuration script that configures the second computer architecture and the second browser.

2. The method of claim 1, wherein configuring the running environment includes initializing a web application testing framework and setting a machine address and browser type for the second browser.

3. The method of claim 1, wherein for each new action in the first browser, the method further comprises updating the test script to emulate the new actions in the second browser.

4. The method of claim 3, wherein updating the test script includes modifying a template file based upon a selected one of the actions in the first browser.

5. The method of claim 1, wherein the user actions are replicated in real time in the second browser by the processing device.

6. A system for executing a computer application in a computer architecture, the system comprising:

a running environment module for managing at least one preselected script;

a control browser module for running a computer application on a first computer architecture having a first browser and a first operating system, the control browser module being operable to generate a test script from the at least one preselected script and to execute the test script on the first browser;

a remote browser module for receiving the test script and for executing the test script on at least one second computer architecture having a second browser different from the first browser and a second operating system different from the first operating system, the remote browser module having a remote control program for executing the test script on the second browser simultaneously while the test script is executed on the first browser by the control browser module; and a processor for managing operation of the running environment module, control browser module and remote browser module;

wherein the preselected script comprises:

a core script that is executed by the system to generate new test scripts for each action by a user in the first browser, a template script that initializes a running environment, and a remote machine configuration script that configures the second computer architecture and the second browser.

7. The system of claim 6, further comprising a user interface module for displaying execution of the test script on the first and second browsers to a user.

8. The system of claim 6, wherein the control browser module generates a new test script for selected actions performed in the first browser, and the remote browser module executes each new test script upon generation by the control browser module so that the selected actions performed in the first browser are replicated in the second browser.

9. The system of claim 6, wherein the running environment module manages the at least one preselected script by initializing a web application testing framework and setting a machine address and browser type for the second browser.

10. The system of claim 9, wherein the machine address and browser type are set in a machine configuration file, the machine configuration file further including a port and test uniform resource locator.

11. The system of claim 10, wherein the control browser module is operable to generate the test script based upon a template file for the web application testing framework and the machine configuration file.

12. A non-transitory computer-readable recording medium having instructions stored thereon, the instructions, when executed by a processor, cause the processor to perform the operations of:

configuring a running environment for managing a preselected script;

running a computer application on a first computer architecture having the processor, a first operating system, and a first browser, including generating a test script from the preselected script and executing the test script on the first browser using the first processing device;

transmitting the test script to at least one second computer architecture on a remote device having a second browser different from the first browser, a second operating system different from the first operating system, and a remote control program for executing the test script on the second browser simultaneously while the test script is executed on the first browser, wherein user actions in the first browser are replicated in real time in the second browser; and receiving results from the remote device of the executed test script;

wherein the preselected script comprises:

a core script that is executed by the system to generate new test scripts for each action by a user in the first browser, a template script that initializes a running environment, and a remote machine configuration script that configures the second computer architecture and the second browser.

13. The non-transitory computer-readable recording medium of claim 12, wherein configuring the running environment includes initializing a web application testing framework and setting a machine address and browser type for the second browser.

14. The non-transitory computer-readable recording medium of claim 12, wherein for each new action in the first browser, the method further comprises updating the test script to emulate the new actions in the second browser.

15. The non-transitory computer-readable recording medium of claim 14, wherein updating the test script includes modifying a template file based upon a selected one of the actions in the first browser.

* * * * *